US009731586B2

(12) United States Patent
Sakamoto et al.

(10) Patent No.: US 9,731,586 B2
(45) Date of Patent: Aug. 15, 2017

(54) MOUNT APPARATUS

(71) Applicants: YAMASHITA RUBBER CO., LTD., Fujimino, Saitama (JP); HONDA MOTOR CO., LTD., Tokyo (JP)

(72) Inventors: Kazuyuki Sakamoto, Saitama (JP); Benjamin Linfield, Raymond, OH (US)

(73) Assignees: YAMASHITA RUBBER CO., LTD., Fujimino (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/993,763

(22) Filed: Jan. 12, 2016

(65) Prior Publication Data

US 2016/0201756 A1 Jul. 14, 2016

(30) Foreign Application Priority Data

Jan. 13, 2015 (JP) ................... 2015-003979

(51) Int. Cl.
| | |
|---|---|
| F16M 1/00 | (2006.01) |
| B60K 5/12 | (2006.01) |
| F16M 13/02 | (2006.01) |
| F16F 1/38 | (2006.01) |

(52) U.S. Cl.
CPC .......... *B60K 5/1208* (2013.01); *F16F 1/3849* (2013.01); *F16M 13/02* (2013.01)

(58) Field of Classification Search
CPC ........ F16B 5/0685; F16L 3/1207; B16L 3/04; B60K 5/1208
See application file for complete search history.

(56) References Cited

U.S. PATENT DOCUMENTS

| | | | | |
|---|---|---|---|---|
| 5,215,281 | A * | 6/1993 | Sherman | ............... F16L 55/035 |
| | | | | 248/219.4 |
| 6,234,541 | B1 * | 5/2001 | Wagner | ............... F01N 13/1805 |
| | | | | 24/277 |
| 7,722,001 | B2 * | 5/2010 | Trotter | .................. F16B 5/0685 |
| | | | | 248/65 |
| 7,770,847 | B1 * | 8/2010 | Severson | ............... A63H 19/24 |
| | | | | 246/1 C |

FOREIGN PATENT DOCUMENTS

| | | |
|---|---|---|
| JP | 6-54936 | 7/1994 |
| JP | 07-293627 | 7/1995 |
| JP | 2009-228787 | 10/2009 |

* cited by examiner

*Primary Examiner* — Amy Sterling
(74) *Attorney, Agent, or Firm* — Rankin, Hill & Clark LLP

(57) ABSTRACT

A mount apparatus that achieves both space saving and weight saving and is excellent in fatigue strength, is provided. The mount apparatus comprises a pair of attachment parts to be attached to a car body, a vibration receiving part, fixed to the attachment parts, for receiving input vibrations from a vibration source through an elastic material, and a dropout prevention plate supporting the vibration receiving part, the attachment parts and the vibration receiving part being made of resin, wherein the dropout prevention plate is arranged so as to cover an outer surface of the vibration receiving part at a predetermined interval from the outer surface of the vibration receiving part, wherein both ends of the dropout prevention plate is fixed through the pair of attachment parts to the car body.

2 Claims, 5 Drawing Sheets

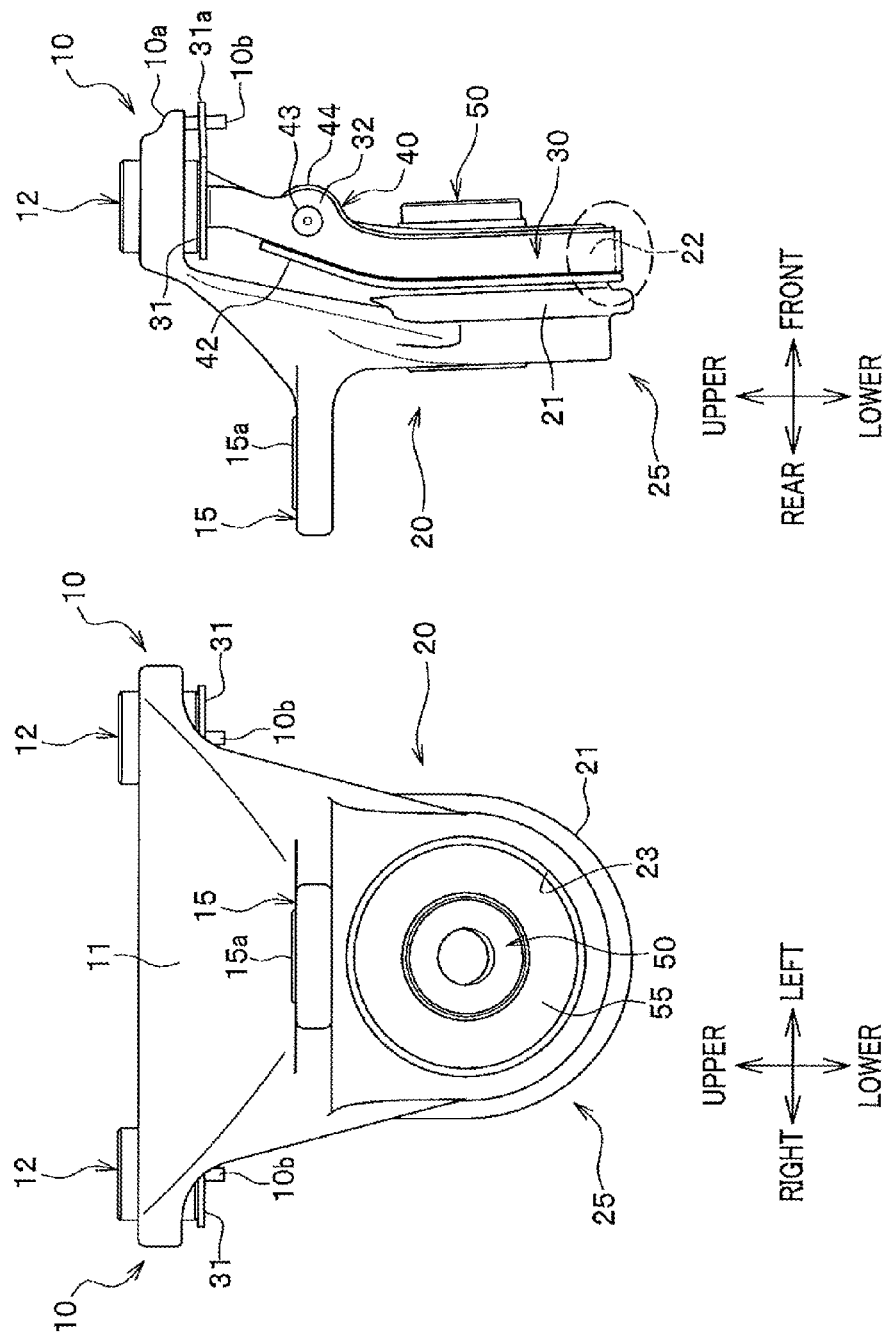
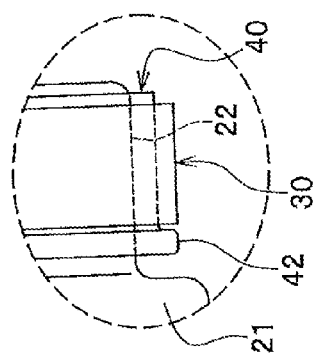

MOUNT APPARATUS

CROSS REFERENCE TO RELATED APPLICATIONS

This application claims priority to Japanese Patent Application No. 2015-003979 filed on Jan. 13, 2015, the entire contents of which are incorporated by reference herein.

BACKGROUND OF INVENTION

1. Technical Field

The present invention relates to a mount apparatus of a suspended type.

2. Related Art

Conventionally, an apparatus as described in JPH06-54936(U) is known as a mount apparatus for supporting heavy goods such as an engine, electric motors, a differential gear, etc. of motorcars. This mount apparatus comprises an outer tube made of resin to which a rubber cushion is adhered by vulcanization, and a bracket made of metal surrounding an upper half surface of the outer tube and having an attachment part formed so as to be fixed to a body frame in its lower part.

Incidentally, since the mount apparatus as described in JPH06-54936(U) has a structure to be mounted on the body frame, etc., space saving is desired in order to reduce an installation area. In order to achieve the space saving, the mount apparatus would be advantageously of a suspended type. However, there is a problem that, if the mount apparatus is of the suspended type, the size of the apparatus will be larger and the apparatus will be heavier, in order to ensure a fatigue strength.

SUMMARY OF INVENTION

The present invention has been made to solve the above problem, and its object is to provide a mount apparatus that achieves both space saving and weight saving and is excellent in the fatigue strength.

A mount apparatus according to the present invention that solves above problem comprises a pair of attachment parts to be attached to a car body, a vibration receiving part, fixed to the attachment parts, for receiving input vibrations from a vibration source through an elastic material, and a dropout prevention plate supporting the vibration receiving part, the attachment parts and the vibration receiving part being made of resin, wherein the dropout prevention plate is arranged so as to cover an outer surface of the vibration receiving part at a predetermined interval from the outer surface of the vibration receiving part, wherein both ends of the dropout prevention plate are fixed through the pair of attachment parts to the car body.

In the present invention, since the pair of attachment parts and the vibration receiving part are made of resin, weight saving is achieved. Further, since the vibration receiving part is supported by the dropout prevention plate fixed to a car body, dropout of the vibration receiving part from the car body is preferably prevented. Therefore, a mount apparatus excellent in fatigue strength is obtained.

Furthermore, since the dropout prevention plate is arranged so as to cover the outer surface of the vibration receiving part at a predetermined interval from the outer surface of the vibration receiving part, sound of beating and frictional wear caused by collision between the vibration receiving part and the dropout prevention plate can be prevented. Thus, strength and durability of the mount apparatus are improved.

Further, an elastic member is preferably interposed between the vibration receiving part and the dropout prevention plate. In this way, collision between the vibration receiving part and the dropout prevention plate can be preferably prevented, and sound of beating and frictional wear caused by the collision between the vibration receiving part and the dropout prevention plate is more preferably prevented. Thus, strength and durability of the mount apparatus are improved.

Further, it is preferable to interpose the elastic member between the vibration receiving part and the dropout prevention plate, to provide a flange part along a circumference of an outer surface of the vibration receiving part, to provide a rib abutting against an edge of the dropout prevention plate, for the elastic member, and to interpose the rib between the flange part and the edge of the dropout prevention plate. By this arrangement, misalignment or unexpected dropout of the elastic member in the vibration receiving part can be preferably prevented. In this way, binding force of the dropout prevention plate to the vibration receiving part strengthens, and sound of beating and frictional wear caused by collision between the flange part and the dropout prevention plate can be prevented, and thus, strength and durability of the mount apparatus are improved.

According to the present invention, there is provided a mount apparatus that achieves both space saving and weight saving, and is excellent in fatigue strength. In addition, by preventing sound of beating and frictional wear, a mount apparatus wherein strength and durability are improved is obtained.

BRIEF EXPLANATION OF DRAWINGS

FIG. 2A is a rear view of the mount apparatus according to the embodiment of the present invention;

FIG. 2B is a left side view of the mount apparatus according to the embodiment of the present invention;

FIG. 2C is a partial enlarged view of a portion surrounded by a broken line in FIG. 2B;

DESCRIPTION OF EMBODIMENTS

Figure 1A:
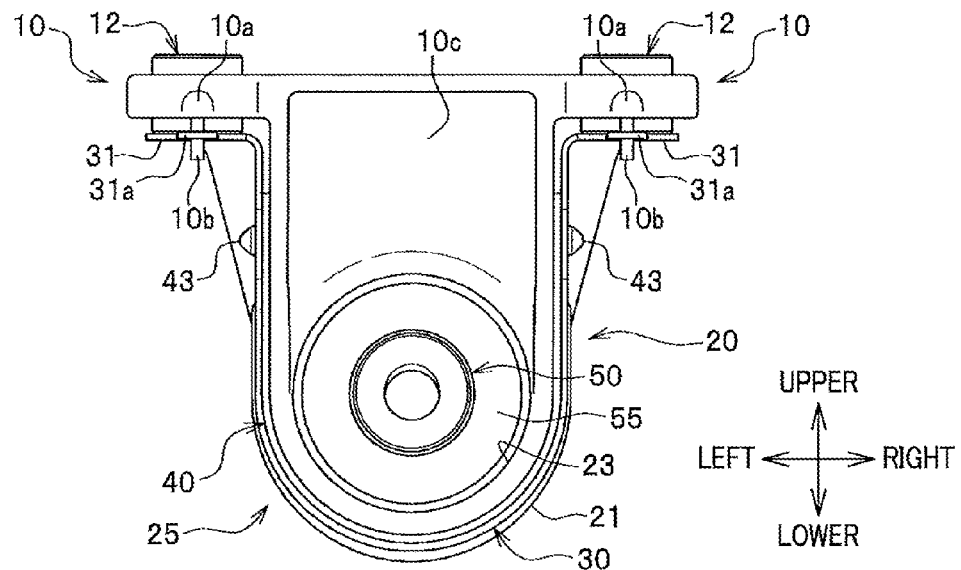
FIG. 1A is a front view of a mount apparatus according to an embodiment of the present invention.

Embodiments of a mount apparatus according to the present invention will be described with reference to the drawings. In the following description, although the words "front/rear", "right/left" and "upper/lower" are used on the basis of directions depicted in FIG. 1, they do not necessarily coincide with real installation condition. In the description, the same reference numerals are used for the same elements, and duplicated description is omitted.

Figure 1B:
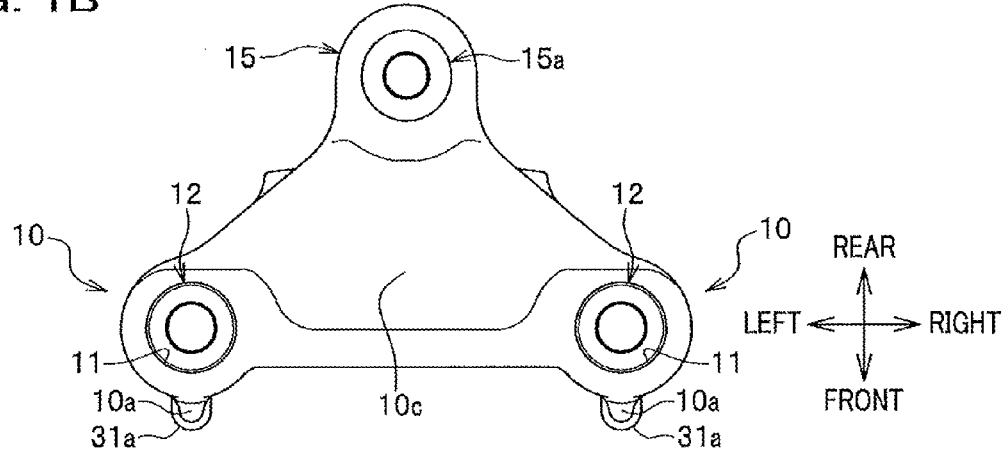
FIG. 1B is a plan view of the mount apparatus according to the embodiment of the present invention.
Figure 1C:
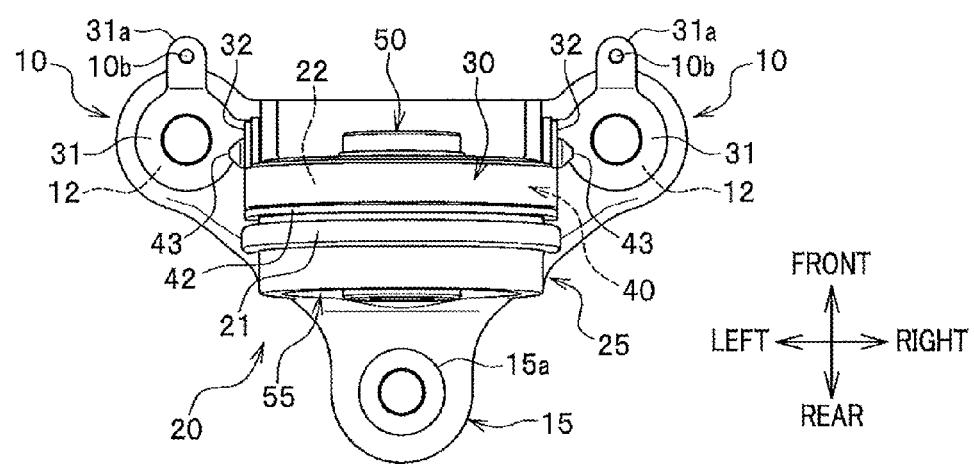
FIG. 1C is a bottom view of the mount apparatus according to the embodiment of the present invention.

As shown in FIGS. 1A to 1C, a mount apparatus is of a suspended type, comprising a pair of attachment parts 10, 10, a vibration receiving part 20, a dropout prevention plate 30 and an elastic member 40. The pair of attachment parts 10, 10 and the vibration receiving part 20 are made of resin, which are integrally molded when they are molded.

The attachment parts 10 are regions to be attached to a frame, etc. of a body side. The attachment parts 10 have a flange shape. An insertion hole 11 (see FIG. 1B) is formed in each attachment part 10. Tubular metal inserts 12 are attached to the insertion holes 11. A fixing bolt B1 for fixing to the body (see FIG. 5) is inserted into each metal insert 12.

Projections 10a are provided at front ends of the attachment parts 10, and pins 10b extending downward are integrally provided on lower surfaces of the projections 10a.

The pair of attachment parts 10, 10 is connected to each other by tabular part 10c extending right and left. On the rear side of the tabular part 10c, a rear side attachment part 15 extending backward is integrally formed, as shown in FIGS. 1B, 1C and FIGS. 2A, 2B. The rear side attachment part 15 has a flange shape. A tubular metal insert 15a is buried in the rear side attachment part 15 (see FIG. 3). Upper and lower surfaces of the metal insert 15a are exposed from upper and lower surfaces of the rear side attachment part 15, respectively. The metal insert 15a is formed by insert molding when the rear side attachment part 15 is molded (i.e., when the attachment parts 10, the tabular part 10c and the vibration receiving part 20 are molded).

The vibration receiving part 20 is a region that receives an input vibration from a vibration source. The vibration receiving part 20 extends continuously downward from the pair of attachment parts 10, 10, and is suspended (fixed) by the pair of attachment parts 10, 10. The vibration receiving part 20 has a curved part (semicircular part) 25 directed downward (directed apart from the pair of attachment parts 10, 10), and have an approximately U-shaped profile in a front view (see FIG. 1A and FIG. 2A). Inside the vibration receiving part 20, an inner tube 50 is supported via a rubber elastomer 55 as an elastic material.

Figure 3:
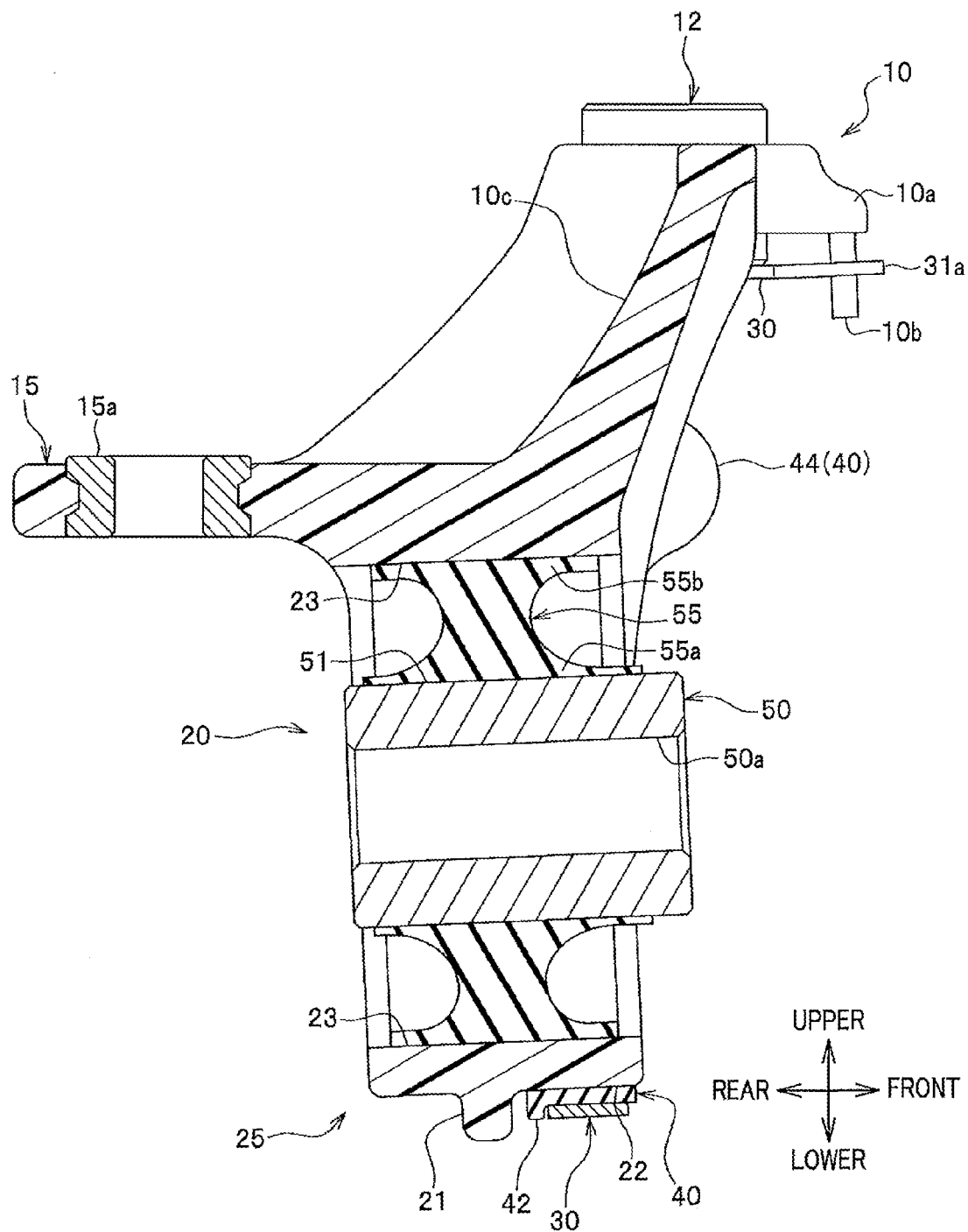
FIG. 3 is a vertical cross-sectional view of the mount apparatus according to the embodiment of the present invention.

The inner tube 50 consists of a tube having a through hole 50a formed in the center thereof (see FIG. 3). The inner tube 50 supports a supporting end E1 provided for supporting heavy goods such as an engine E (see FIG. 5). An axial size of the inner tube 50 is larger than an axial (in a front-rear direction) size of the vibration receiving part 20. Both axial ends of the inner tube 50 protrude from the vibration receiving part 20, as shown in FIG. 2B and FIG. 3.

The inner tube 50 and the vibration receiving part 20 are adhered to the rubber elastomer 55 by vulcanized adhesion means, as shown in FIG. 3. In this way, the inner tube 50 and the vibration receiving part 20 are resiliently coupled with each other. An inner surface 55a of the rubber elastomer 55 is adhered to the outer surface 51 of the inner tube 50 by vulcanization. On the other hand, an outer surface 55b of the rubber elastomer 55 is adhered to an inner surface 23 of the vibration receiving part 20 by vulcanization. The rubber elastomer 55 is formed by injecting melted rubber between the inner tube 50 and the vibration receiving part 20. The inner surface 55a is formed so as to be axially longer than the outer surface 55b.

On an outer surface of the vibration receiving part 20, a flange part 21 is provided so as to circumferentially extend, as shown in FIGS. 2A and 2B. The flange part 21 is formed in a rough center in the front-rear direction, as shown in FIG. 2B, thereby reinforcing the vibration receiving part 20. On the front side of the flange part 21, and on the lateral side of the outer surface 22 of the vibration receiving part 20, a dropout prevention plate 30 is arranged.

The dropout prevention plate 30 is made of metal, and is formed with a U-shaped cross-section, as shown in FIG. 1B, FIG. 1C, FIG. 2B and FIG. 4. The dropout prevention plate 30 is arranged so as to cover the outer surface 22 of the vibration receiving part 20 at a predetermined interval from the outer surface 22 of the vibration receiving part 20. In other words, the dropout prevention plate 30 is arranged contactlessly with the outer surface 22 of the vibration receiving part 20. In this embodiment, an elastic member 40 is interposed between the vibration receiving part 20 and the dropout prevention plate 30. The dropout prevention plate 30 is installed from underneath to the curved part 25 of the vibration receiving part 20 with the elastic member 40 interposed therebetween, thereby supporting the vibration receiving part 20 from underneath, as shown in FIG. 1C and FIG. 2B.

Figure 4:
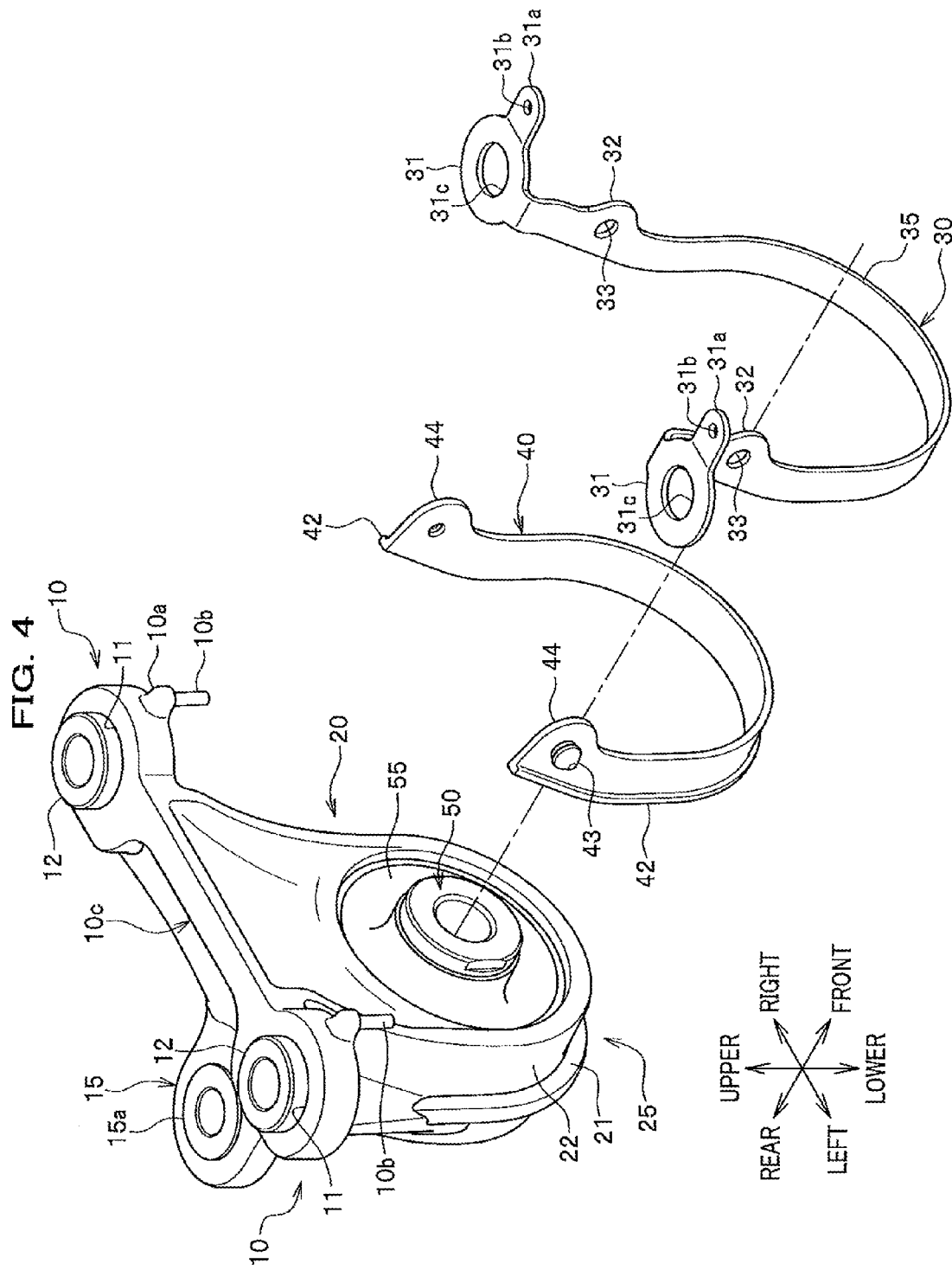
FIG. 4 is an exploded perspective view of the mount apparatus according to the embodiment of the present invention.

The dropout prevention plate 30 has a pair of fixing parts 31, 31 and a U-shaped plate part 35 hanging down from the pair of fixing parts 31, 31, as shown in FIG. 4. The fixing parts 31 are parts that are to abut against lower surfaces of the metal inserts 12 of the attachment parts 10, and represent circular belt shapes. In the fixing parts 31, insertion holes 31c, into which the fixing bolts B1 (see FIG. 5, the same shall apply hereinafter) are inserted, are formed. The fixing bolts B1 are inserted through the insertion holes 31c into the metal inserts 12 and are screwed together with a frame and the like of a car body which is not shown. In this way, the pair of fixing parts 31, 31, together with the pair of attachment parts 10, 10, is fixed to the body via the fixing bolts B1.

Projection parts 31a projecting in a front direction are integrally formed in front ends of the fixing parts 31. Through holes 31b are bored through the projection parts 31a. The through holes 31b are formed so as to oppose pins 10b of the attachment parts 10. The pins 10b of the attachment parts 10 are inserted into the through holes 31b when the dropout prevention plate 30 is installed on the vibration receiving part 20.

A pair of bulging parts 32, 32 is formed in upper part of the plate part 35. Each bulging part 32 bulges out in a front direction in a curved shape. Clasping holes 33 are formed in the bulging parts 32.

The dropout prevention plate 30 is formed by applying punching and bending to a metal plate. By the bending, portions connecting the fixing parts 31 and the plate part 35 are bent approximately 90 degrees and the plate part 35 is bent in a U-shape.

As mentioned above, the elastic member 40 is a member that is interposed between the vibration receiving part 20 and the dropout prevention plate 30, and functions as cushioning. The elastic member 40 is formed with a U-shaped cross-section similarly to the shape of the dropout prevention plate 30. Curved bulging parts 44, 44 opposing the bulging parts 32, 32 of the dropout prevention plate 30 are formed at both ends of the elastic member 40. In each curved bulging part 44, a locking projection 43 that projects laterally is formed. Each of the locking projections 43 is inserted into corresponding one of the clasping holes 33 of the dropout prevention plate 30, and is locked by an edge portion in corresponding one of the clasping holes 33. By virtue of this locking, misalignment of the elastic member 40 due to vibration, etc. is prevented.

A rib 42 is formed on a front edge of the whole elastic member 40. The rib 42 is interposed between the flange part 21 of the vibration receiving part 20 and a rear edge of the dropout prevention plate 30, as shown in FIG. 2C and FIG. 3.

When products of the mount apparatus are shipped, each of the pins 10b of the attachment parts 10 is inserted into corresponding one of the through holes 31b of the fixing parts 31 of the dropout prevention plate 30, and lower ends of the pins 10b are squashed by melting. In this way, the dropout prevention plate 30 and the elastic member 40 will be retained by the pair of attachment parts 10, 10 in a reliable retaining state (dropout inhibited state).

When the mount apparatus is assembled in a car body, etc., the fixing bolts B1 are inserted through the fixing parts 31 of the dropout prevention plate 30 into the metal inserts 12, and are screwed together with a frame or the like of a car body which is not shown. In addition, a fixing bolt B2 is inserted into the metal insert 15a of the rear side attachment part 15, and is screwed together with the frame or the like of the car body which is not shown. In this way, the mount apparatus is assembled in the car body in a state where the mount apparatus is suspended and supported at three points.

Figure 5:
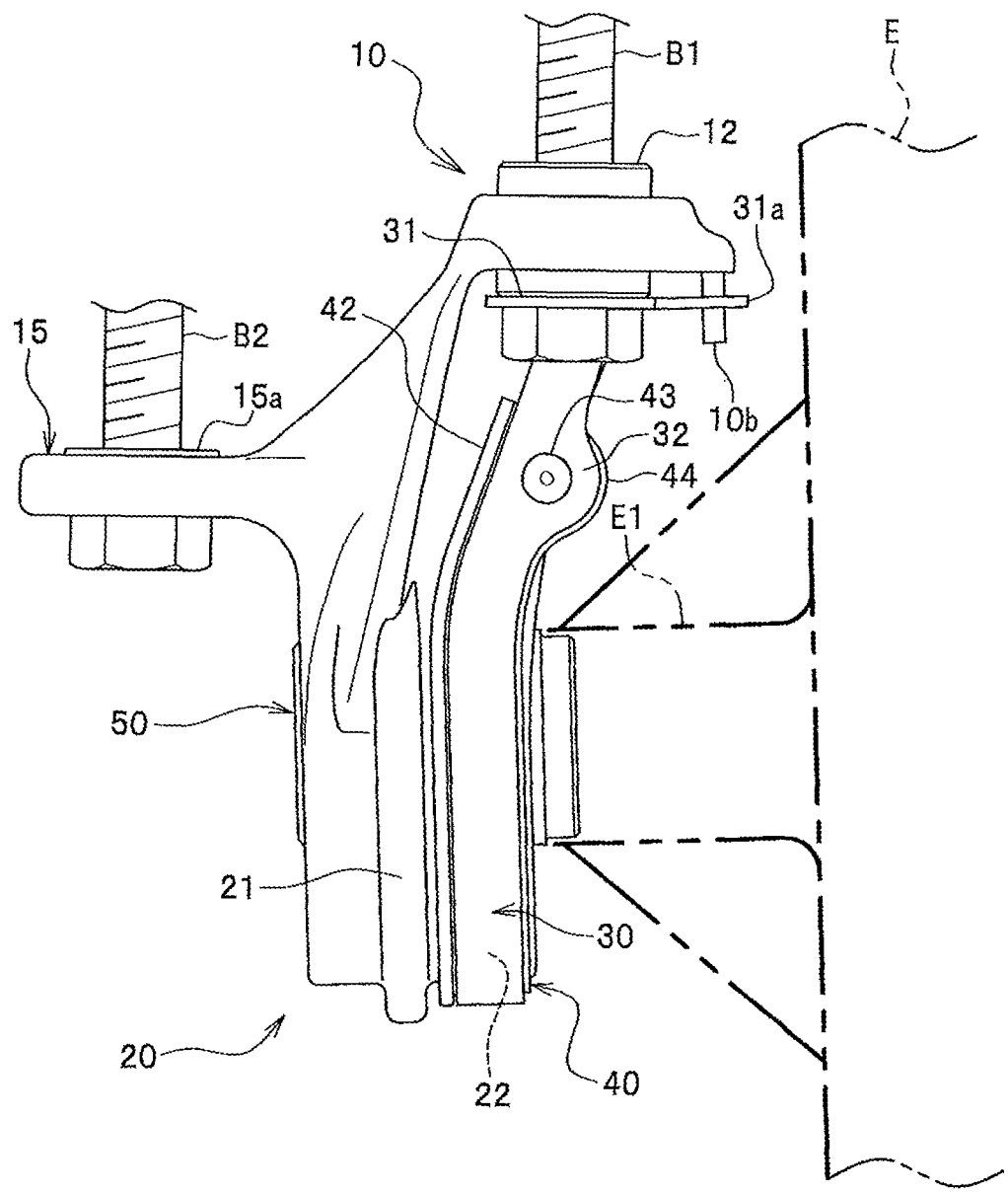
FIG. 5 is a side view showing supporting condition.

Thereafter, as shown in FIG. 5, a supporting end E1 of an engine E, which is to be supported, is inserted into the inner tube 50 of the vibration receiving part 20, and is supported.

In the embodiment of the mount apparatus as described above, since the pair of attachment parts 10, 10 and the vibration receiving part 20 are made of resin, weight saving is achieved. Further, since the vibration receiving part 20 is supported (supported from underneath) by the dropout prevention plate 30 fixed to a car body, dropout of the vibration receiving part 20 from the car body is preferably prevented. Therefore, a mount apparatus excellent in fatigue strength is obtained.

Furthermore, since the dropout prevention plate 30 is arranged so as to cover the outer surface 22 of the vibration receiving part 20 a predetermined distance apart from the outer surface 22 of the vibration receiving part 20, sound of beating and frictional wear caused by collision between the vibration receiving part 20 and the dropout prevention plate 30 can be prevented. Thus, strength and durability of the mount apparatus are improved.

Further, since the elastic member 40 is interposed between the vibration receiving part 20 and the dropout prevention plate 30, sound of beating and frictional wear caused by collision between the vibration receiving part 20 and the dropout prevention plate 30 are more preferably prevented. Thus, strength and durability of the mount apparatus are improved.

Further, since the rib 42 provided for the elastic member 40 is arranged between the flange part 21 and the rear edge of the dropout prevention plate 30, misalignment or unexpected dropout of the elastic member 40 in the vibration receiving part 20 can be preferably prevented. Therefore, binding force of the dropout prevention plate 30 to the vibration receiving part 20 strengthens, and sound of beating and frictional wear caused by collision between the flange part 21 and the dropout prevention plate 30 can be prevented, and thus, strength and durability of the mount apparatus are improved.

Although an embodiment of the present invention has been described as mentioned above, the present invention is not limited to the above embodiment but various modifications are possible.

For example, the elastic member is not necessarily provided, but it is sufficient that the dropout prevention plate 30 is arranged so as to cover the outer surface 22 of the curved part 25 of the vibration receiving part 20 at a predetermined interval from the outer surface 22.

Further, a width of the dropout prevention plate 30 in the front-rear direction is not limited to one described in the embodiment, but one which is formed so as to be narrower in the front-rear direction or one which is formed so as to be broader in the front-rear direction on the contrary, may be used as well.

The rear side attachment part 15 is not necessarily provided.

Although the vibration receiving part 20 which is suspended by the pair of attachment parts 10, 10 has been described, a positional relationship between the vibration receiving part 20 and the pair of attachment parts 10, 10 is not limited to this, but various positional relationships may be adopted. For example, they may be arranged inversely in the upper-lower direction, arranged in the right-left direction, or further, arranged so as to lean from the vertical direction.

It is sufficient that the dropout prevention plate 30 is one which can be fixed to the car body by the fixing bolts B1, B2 together with the pair of attachment parts 10, 10 provided for the vibration receiving part 20, responsive to such positional relationship between the vibration receiving part 20 and the pair of attachment parts 10, 10.

Although the vibration receiving part 20 and the dropout prevention plate 30, both of which have the approximately U-shaped profile, have been described, the present invention is not limited to this, but various profiles may be adopted. For example, rectangular shape, polygonal shape or curved shape may be adopted. Further, profiles of the vibration receiving part 20 and the dropout prevention plate 30 are not limited to be identical to each other, but may be wholly or partially different from each other.

The interval between the vibration receiving part 20 and the dropout prevention plate 30 may be appropriately determined. In this case, the interval between the vibration receiving part 20 and the dropout prevention plate 30 may be constant in the longitudinal direction of the dropout prevention plate 30, or may be varied in the longitudinal direction.

The dropout prevention plate 30 may have a part being in contact with the outer surface 22 of the vibration receiving part 20. The part being in contact with the outer surface 22 may be plural at intervals along the circumference of the outer surface 22.

Further, the dropout prevention plate 30 may cover only the curved part (semicircular part: a part to which a load is applied when dropping out) of the outer surface 22 of the vibration receiving part 20.

Although the elastic member 40 is substantially wholly inserted between the vibration receiving part 20 and the dropout prevention plate 30, the present invention is not limited to this, but it may be partially inserted between the vibration receiving part 20 and the dropout prevention plate 30. In this case, the elastic member 40 may be inserted partially at intervals (scattered at intervals) along the circumference of the vibration receiving part 20 and the dropout prevention plate 30.

EXPLANATION OF REFERENCE NUMERALS 10 attachment part
20 vibration receiving part
21 flange part
25 curved part
30 dropout prevention plate
40 elastic member
42 rib

The invention claimed is:

1. A mount apparatus, comprising:
a pair of attachment parts to be attached to a car body;
a vibration receiving part, fixed to the attachment parts, for receiving input vibrations from a vibration source through an elastic material; and
a dropout prevention plate supporting the vibration receiving part,
the attachment parts and the vibration receiving part being made of resin,
wherein the dropout prevention plate is arranged so as to cover an outer surface of the vibration receiving part at a predetermined interval from the outer surface of the vibration receiving part,
wherein both ends of the dropout prevention plate are fixed through the pair of attachment parts to the car body,
wherein the vibration receiving part is configured to surround an end of the vibration source, and
wherein an elastic member is interposed between the vibration receiving part and the dropout prevention plate.

2. The mount apparatus as claimed in claim 1, wherein a flange part is provided along a circumference of the outer surface of the vibration receiving part,
wherein a rib is provided for the elastic member, the rib abutting against an edge of the dropout prevention plate,
wherein the rib is interposed between the flange part and the edge of the dropout prevention plate.

* * * * *